US009242257B2

(12) United States Patent
McGee

(10) Patent No.: US 9,242,257 B2
(45) Date of Patent: Jan. 26, 2016

(54) VARIABLE NOZZLE ASSEMBLY

(75) Inventor: Ricky D. McGee, Gretna, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 652 days.

(21) Appl. No.: 13/570,631

(22) Filed: Aug. 9, 2012

(65) Prior Publication Data
US 2013/0037630 A1 Feb. 14, 2013

Related U.S. Application Data

(60) Provisional application No. 61/521,727, filed on Aug. 9, 2011.

(51) Int. Cl.
*B05B 3/16* (2006.01)
*A01G 25/09* (2006.01)
*B05B 1/30* (2006.01)

(52) U.S. Cl.
CPC ............... *B05B 3/16* (2013.01); *A01G 25/092* (2013.01); *B05B 1/3006* (2013.01)

(58) Field of Classification Search
CPC ......... B05B 1/26; B05B 1/3006; B05B 3/16; A01G 25/092
USPC .......................................... 239/728, 257, 518
See application file for complete search history.

(56) References Cited

U.S. PATENT DOCUMENTS

| 551,754 | A | * | 12/1895 | Bryant | 239/257 |
|---|---|---|---|---|---|
| 1,180,170 | A | * | 4/1916 | Marsh et al. | 239/257 |
| 1,602,748 | A | * | 10/1926 | Browning | 239/456 |
| 1,704,610 | A | * | 3/1929 | Jaden | 239/252 |
| 3,045,924 | A | * | 7/1962 | McIlhenny | 239/254 |
| 3,066,871 | A | * | 12/1962 | Born | 239/254 |
| 4,452,394 | A | | 6/1984 | Emrich | |
| 4,492,339 | A | * | 1/1985 | Kreitzberg | 239/230 |
| 4,531,674 | A | | 7/1985 | Drechsel | |
| 5,392,990 | A | | 2/1995 | Iwata | |
| 6,138,928 | A | | 10/2000 | LaRue | |

* cited by examiner

*Primary Examiner* — Arthur O Hall
*Assistant Examiner* — Chee-Chong Lee
(74) *Attorney, Agent, or Firm* — David H. Milligan

(57) ABSTRACT

The present disclosure is directed to a variable nozzle assembly. In one or more implementations, the variable nozzle assembly includes a support structure for connecting to a conduit. The variable nozzle assembly also includes a first plate portion translationally coupled to the support structure and a second plate portion fixedly coupled to the support structure, where the first plate portion and the second plate portion define a nozzle. A deflector is coupled to a mechanical actuator to cause the first plate portion to translate between a first position and a second position with respect to the second plate portion to control an opening characteristic of the nozzle.

1 Claim, 6 Drawing Sheets

US 9,242,257 B2

VARIABLE NOZZLE ASSEMBLY

CROSS-REFERENCE TO RELATED APPLICATIONS

The present application claims the benefit under 35 U.S.C. §119(e) of U.S. Provisional Application Ser. No. 61/521,727, entitled VARIABLE NOZZLE ASSEMBLY, filed on Aug. 9, 2011. U.S. Provisional Application Ser. No. 61/521,727 is herein incorporated by reference in its entirety.

BACKGROUND

Nozzles are utilized to control the direction and/or the characteristics (e.g., flow, speed, shape, and/or pressure of a stream) of fluid flow as the fluid exits a fluid conduit (e.g., pipe, orifice, etc.). Irrigation systems, such as center pivot irrigation systems and linear move irrigation systems, typically include nozzles to control the direction and/or the characteristics of an applicant (e.g., water, fertilizer, etc.) over an area of land, such as farmland.

SUMMARY

The present disclosure is directed to a variable nozzle assembly. In one or more implementations, the variable nozzle assembly includes a support structure for connecting to a conduit. The variable nozzle assembly also includes a first plate portion translationally coupled to the support structure and a second plate portion fixedly coupled to the support structure, where the first plate portion and the second plate portion define a nozzle. A deflector is coupled to a mechanical actuator to cause the first plate portion to translate between a first position and a second position with respect to the second plate portion to control an opening characteristic of the nozzle.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The Detailed Description is described with reference to the accompanying figures. The use of the same reference numbers in different instances in the description and the figures may indicate similar or identical items.

DETAILED DESCRIPTION

Figure 1A:
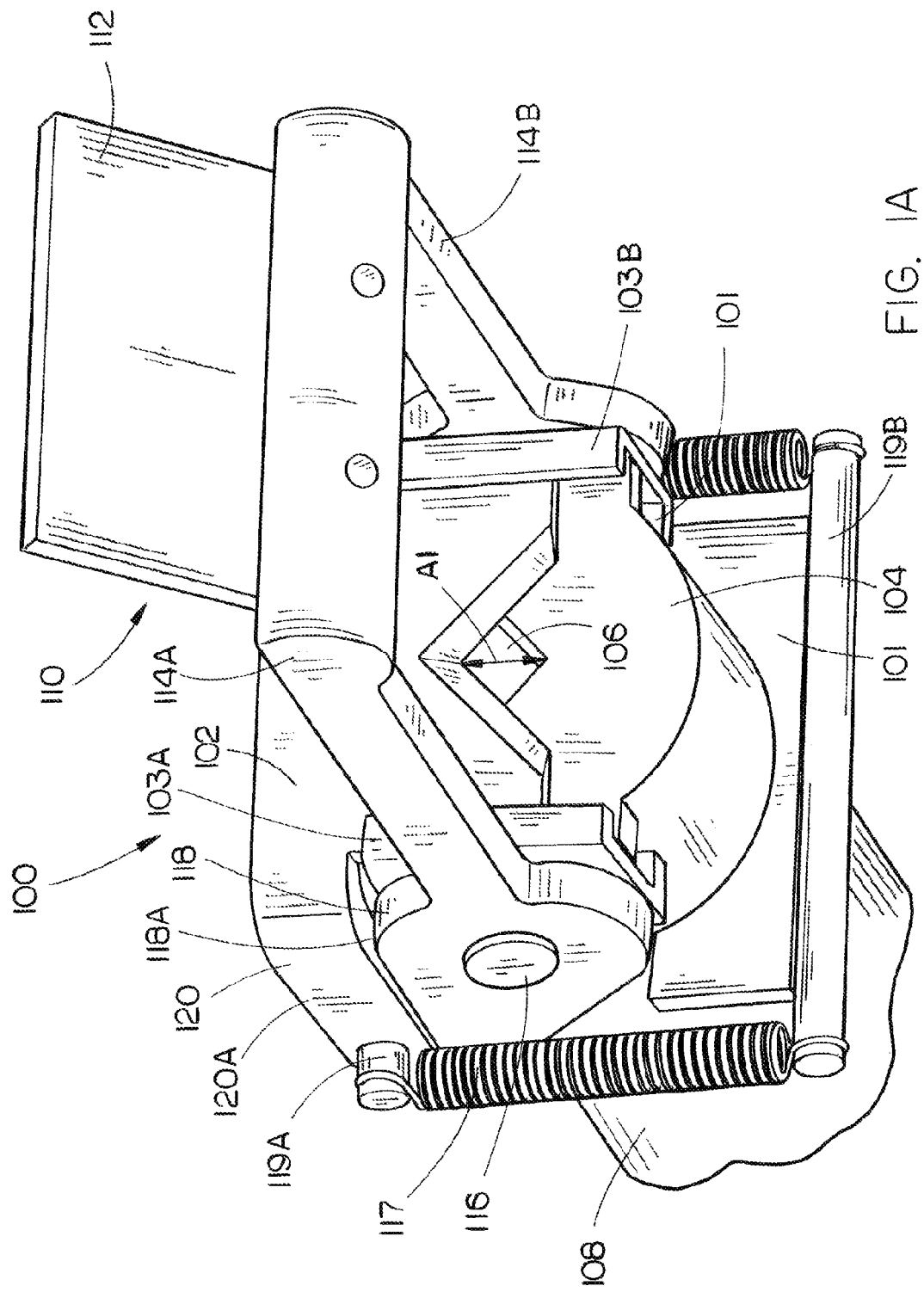
FIG. 1A is a diagrammatic perspective view of an example implementation of a variable nozzle assembly in accordance with the present disclosure, where the nozzle has a first opening characteristic.

FIGS. 1A through 1E illustrate example implementations of a variable nozzle assembly 100 in accordance with the present disclosure. The variable nozzle assembly 100 includes a support structure 101, a first plate portion 102, and a second plate portion 104. The first plate portion 102 and the second plate portion 104 define a nozzle 106 when the first plate portion 102 is in a first position relative to the second plate portion 104. In one or more implementations, the first plate portion 102 and the second plate portion 104 define a nozzle 106. The nozzle 106 may comprise a variety of shapes including, but not limited to: a rectangle, a square, a circle, an oval, and so forth. In one or more implementations, the support structure 101 is integral with the second plate portion 104. Moreover, the first plate portion 102 is moveably coupled to the support structure 101. For instance, one or more flanges 103 (e.g., a first flange 103A and a second flange 103B) translationally couple the first plate portion 102 to the support structure 101 so the first plate portion 102 may translate (e.g., transition) between a first position and a second position. The nozzle 106 is configured to control the direction and the characteristics of a fluid flow as the applicant exits an applicant conduit 108 to which the nozzle assembly 100 is attached to. The applicant conduit 108 may be a hose, or a pipe, or the like, that is included in an irrigation structure, such as a center pivot irrigations system, a linear move irrigations system, or the like. The applicant conduit 108 serves to furnish applicants, such as water, to one or more nozzle assemblies 100 utilized within an irrigation system 200 (see FIG. 2) for irrigation purposes. In one or more implementations, the applicant conduit 108 may be coupled to a pipe of the irrigation system, such as the irrigation system 200.

The variable nozzle assembly 100 also includes a deflector assembly 110 coupled to the support structure 101. The deflector assembly 110 includes a deflector 112 configured to deflect an applicant dispersed from the nozzle 106 when the deflector 112 is positioned in a horizontal plane with nozzle 106. As shown in FIGS. 1A through 1E, the deflector 112 is distal from the nozzle 106. The deflector assembly 110 also includes one or more arms 114 (a first arm 114A and a second arm 114B are shown in FIGS. 1A through 1E) that rotatably couple the deflector 110 to the support structure 101. The arms 114 may be connected to the structure 101 through one or more suitable fastening devices 116 (e.g., screws, rods, etc.) that allow for pivotal rotation of the arms 114.

Figure 1B:
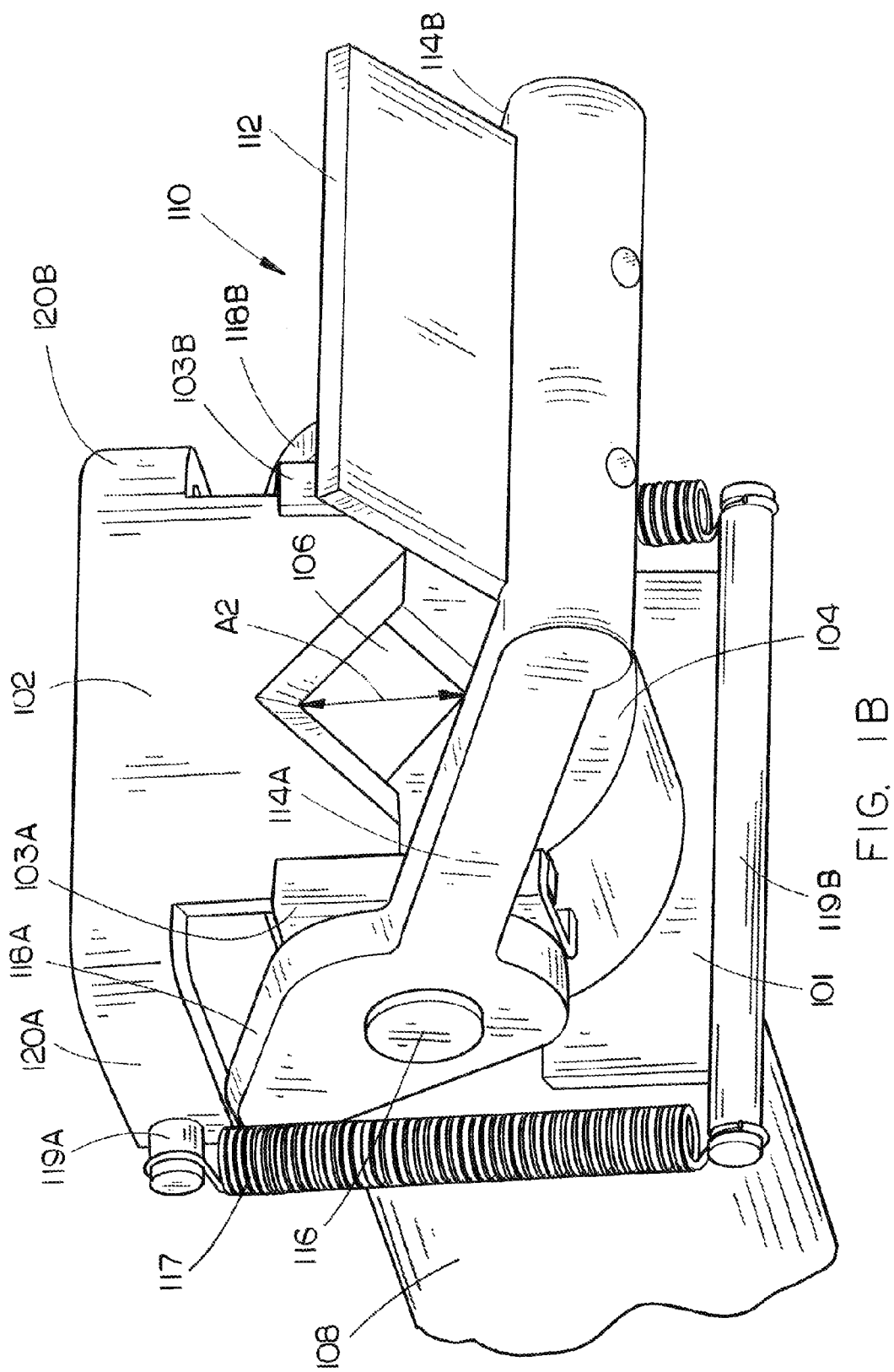
FIG. 1B is a diagrammatic perspective view of the variable nozzle assembly shown in FIG. 1A, where the nozzle has a second opening characteristic.
Figure 1C:
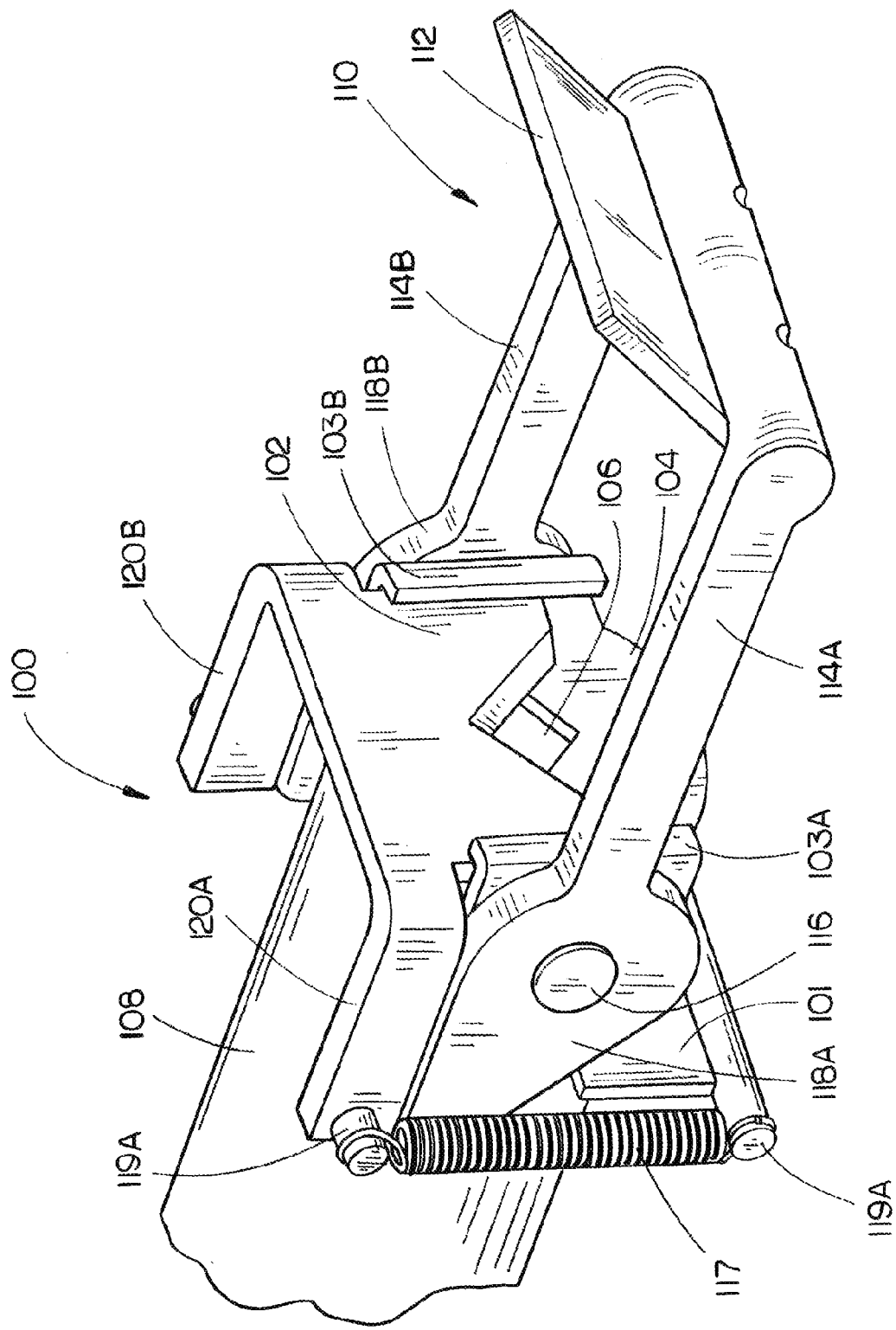
FIG. 1C is another diagrammatic perspective view of the variable nozzle assembly shown in FIG. 1A, where the nozzle has a first opening characteristic.
Figure 1D:
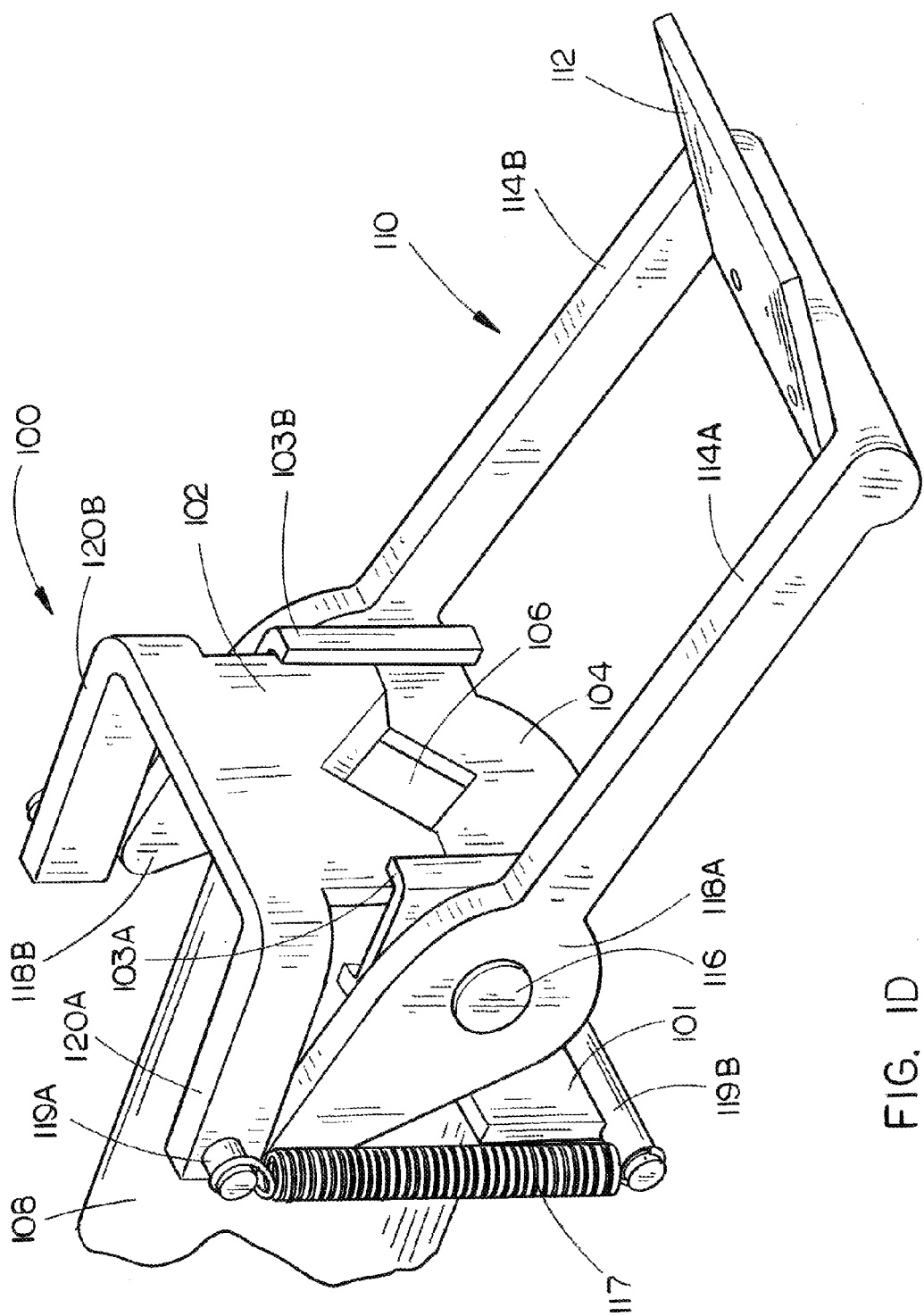
FIG. 1D is a diagrammatic perspective view of the variable nozzle assembly shown in FIG. 1C, where the nozzle has a second opening characteristic.

As shown in FIGS. 1A through 1E, the variable nozzle assembly 100 further includes a biasing structure, such as spring 117, that is configured to hold the deflector 112 in a first position until a force is exerted on the deflector 112 sufficient to stretch the spring 117 and allow the arms 114 to rotate, which translates the deflector 112 to a second position. The spring 117 may be disposed between a first attachment member 119A and a second attachment member 119B. In an implementation, as illustrated in FIGS. 1A through 1B, the first attachment member 119A is fixedly coupled to the support structure 101 proximate to the first plate portion 102, and the second attachment member 119B is fixedly coupled to the support structure 101 proximate to the second plate portion 104. The attachment members 119A, 119B may be configured in a variety of ways. For example, the attachment members 119A, 119B may be a rod, a hook, and the like. In an implementation, when an irrigation structure is in operation, an applicant may be dispersed from the nozzle 106 at a given pressure to exert a sufficient amount of force upon the deflector 112 to displace the deflector 112 from a first position to a second position. In one or more implementations, the spring 117 may have varying K-factor values so that the second position is a function of the K-factor. While only one spring 117 is shown, it is contemplated that the variable nozzle assembly 100 may include multiple springs and corresponding attachment members depending upon the design requirements of the variable nozzle assembly 100.

Figure 1E:
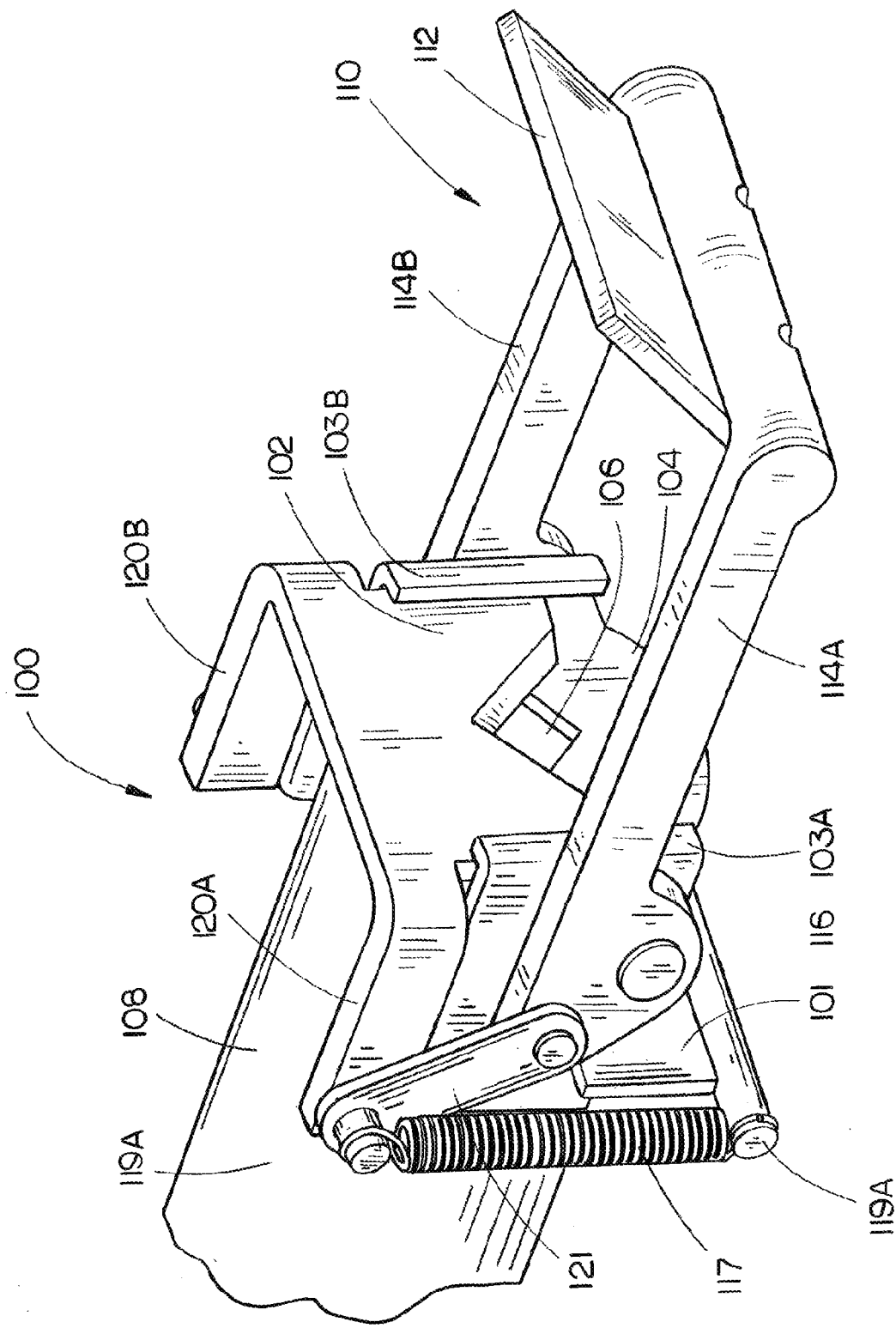
FIG. 1E is a diagrammatic perspective view of another example implementation of a variable nozzle assembly in accordance with the present disclosure.

As shown in FIGS. 1A through 1E, in a specific implementation, each arm 114 (arms 114A, 114B) is coupled to a mechanical actuator that is configured to control an opening characteristic of the nozzle. In an implementation, the mechanical actuator comprises an orientationally dependent biasing structure, such as a cam 118, to assist in converting rotary motion to linear motion utilizing cam followers 120. The cam 118 is rotatably coupled to the support structure 101 by way of the fastening device 116. As shown in FIGS. 1A through 1E, a first cam 118A and a second cam 118B are in contact with a first cam follower 120A and a second cam follower 120B so that the rotary motion of the cams 118A, 118B displaces the cam followers 120A, 120B. The cam followers 120A, 120B are coupled to the first plate portion 102 and translate the first plate portion 102 from a first position to a second position when the cam followers 120A, 120B are displaced as a result of the rotary motion of the cams 118A, 118B. In another implementation, as shown in FIG. 1E, the mechanical actuator comprises a linkage assembly 121. Thus, the linkage assembly 121 is coupled to the deflector 112 by way of the arms 114. Additionally, the linkage assembly 121 is coupled to the first plate portion 102. The linkage assembly 121 is configured to cause the first plate portion 102 to translate with respect to the second plate portion 104, which controls an opening characteristic of the nozzle 106 (as described in greater detail below).

As shown in FIG. 1A, when the first plate portion 102 is in a first position, the nozzle 106 has a first opening characteristic for permitting a smaller volume of applicant flow through the nozzle 106. As shown in FIG. 1B, when the first plate portion 102 is in a second position, the nozzle has a second opening characteristic permitting a larger volume of applicant flow through the nozzle 106. The opening characteristics are a function of the area of the nozzle 106. In one or more implementations, the area of the nozzle 106 may be related to the diameter (A1 of FIG. 1A and A2 of FIG. 1B) of the nozzle 106. For instance, the initial area (A1) of the nozzle 106 may allow for the smallest volume of applicant to flow through the nozzle 106. However, the force of the applicant exerted upon the deflector 112 displaces the deflector 112 from its first position to a second position (any position that is different from the first position), which rotates the cams 118A, 118B by way of the arms 114A, 114B. The rotation of the cams 118A, 118B displaces the cam followers 120A, 120B to provide linear motion to the first plate portion 102 to make the area of the nozzle larger until the first plate portion 102 reaches the second position and the area (A2) of the nozzle 106 is larger than the initial area (A1). It is contemplated the displacement of the deflector 112, in conjunction with the spring 117 returning to its non-stretched state, allows the first plate portion 102 to translate to its first position to allow the area of the nozzle 106 to become smaller (e.g., having a opening characteristic for permitting a smaller volume of applicant flow through the nozzle 106).

It is contemplated that the displacement of the deflector 112 may be a function of the pressure applied to the applicant released from the nozzle 106. Thus, the first plate portion 102 is configured to translate from a first position having a first opening characteristic to allow a smaller volume of applicant to flow through the nozzle 106 to a second position having a second opening characteristic to allow a larger volume of applicant to flow through the nozzle 106, and vice versa. It is contemplated that the range of the first position and the second position of the deflector 112 may encompass a multitude of positions that the deflector 112 is configured to traverse when a force of an applicant displaces the deflector 112. For example, the first position may be any position of the deflector 112 that corresponds to the nozzle 106 having a first opening characteristic for permitting a smaller volume of applicant flow through the nozzle 106, and the second position may be any subsequent position relative to the first position corresponding to the nozzle 106 having a second opening characteristic for permitting a larger volume of applicant flow through the nozzle 106.

As described above and as shown in FIG. 2, the variable nozzle assembly 100 is configured to be utilized with an irrigation system, such as a self-propelled center pivot irrigation system 200. As shown, the irrigation system 200 includes a center pivot structure 202 and a main section assembly 204 (irrigation section assembly) coupled (e.g., connected) to the center pivot structure 202. The irrigation system 200 has access to a well, a water repository (e.g., water tank), or other fluid source, to furnish water to the irrigation system 200. For instance, the well may be located under the center pivot structure 202. In another instance, the well may be in close proximity to the cultivation area (e.g., field). The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like. Additionally, the irrigation system 200 may be coupled to a fluid displacement device (e.g., a pump assembly) configured to furnish applicant throughout the irrigation system 200. For example, the fluid displacement device may assist in displacing fluid from the fluid source (e.g., well, water repository, etc.) to the conduit portions of the irrigation system which are described herein. The center pivot structure 202 can be fixed or can be towable such that an operator can transition the irrigation system 200 from one field to another. In an implementation, the center pivot structure 202 may comprise a frame assembly (e.g., galvanized steel frame assembly, and so forth).

The main section assembly 204 includes a number of interconnected spans 206, 208 (e.g., irrigation spans) supported by one or more tower structures 210 (an intermediate tower structure) and an end tower structure 212. The tower structures 210, 212 may be any suitable tower configuration that adequately supports the conduits (e.g., water pipe sections) described herein. It is understood that the section assembly 204 may include any number of spans and tower structures according to the requirements of the irrigation system 200.

The tower structures 210, 212 each include wheels 214, 216, to assist in traversing the irrigation system 200 (e.g., allowing the main section assembly 204 to pivot) about a cultivation area (e.g., field). In an implementation, the wheels 214, 216 may be driven by a suitable variable-drive unit 218 (e.g., drive motor), or the like, to assist in traversing the system 200 about the specified area. For example, each tower structure 210, 212 may include a drive unit 218 to propel the respective tower structure 210, 212 (and the irrigation system 200) through the cultivation area.

Figure 2:
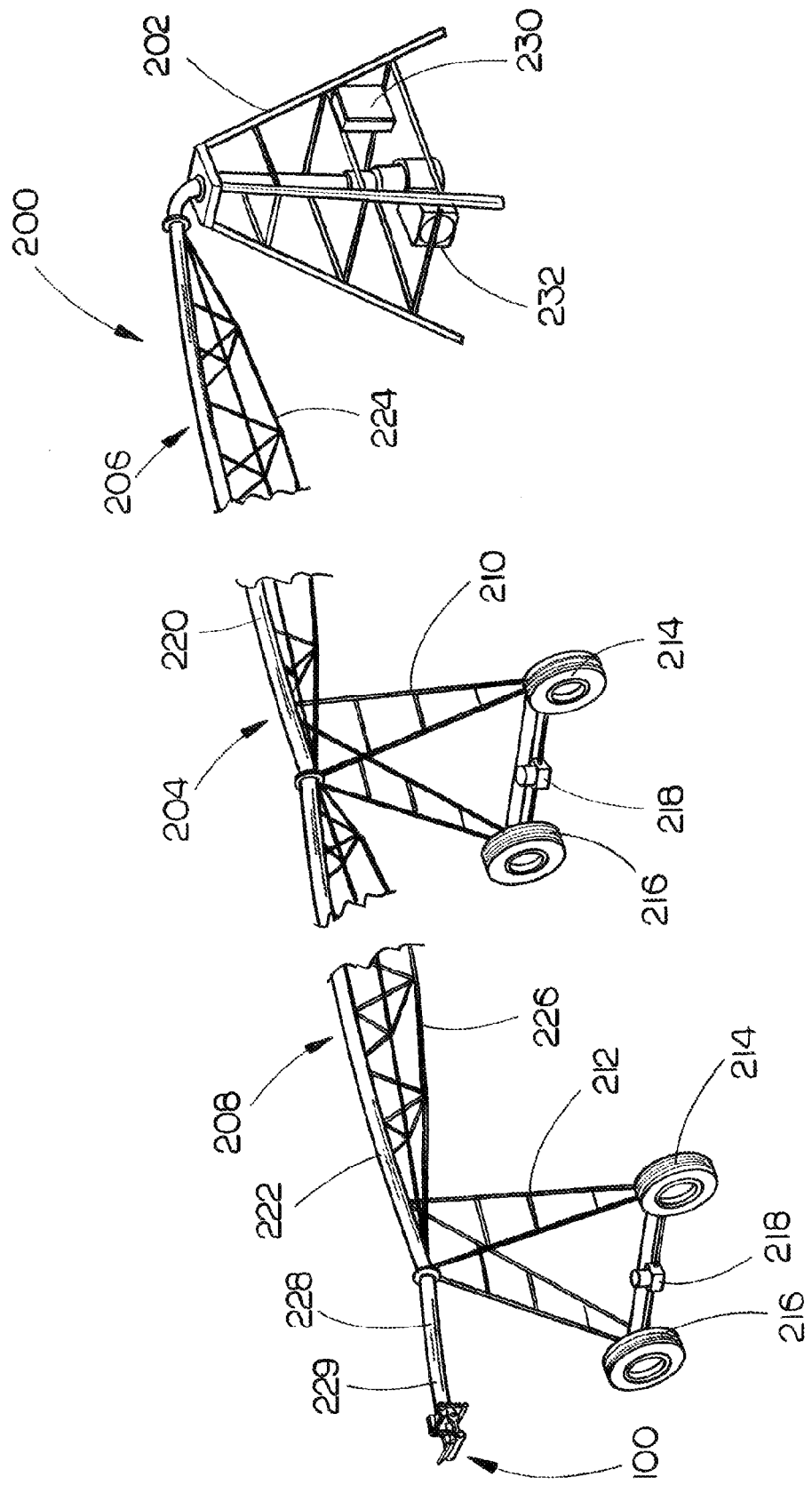
FIG. 2 is a partial diagrammatic perspective view illustrating an irrigation system having the variable nozzle assembly shown in FIGS. 1A through 1E.

As shown in FIG. 2, each span 206, 208 includes conduits 220, 222 (e.g., pipes) that are configured to carry (e.g., transport, provide, and so forth) liquid (e.g., applicant) along the length of the system 200 to one or more applicant dispersal assemblies that are configured to irrigate the cultivation area. Each conduit 220, 222 may be coupled to one another to allow fluid communication between each conduit. In an implementation, the conduits 220, 222 may be supported by truss-type framework structures 224, 226. Thus, the main fluid displacement device may be configured to displace applicant through the conduits 220, 222. As shown in FIG. 2, the irrigation system 200 also includes a cantilevered boom structure 228 that extends outwardly from the end tower structure 212. In one or more implementations, the cantilevered boom 228 includes a supply conduit 229 in fluid communication with the conduit 222. As shown, the variable nozzle assembly 100 is coupled to the supply conduit 229. As described above, the variable nozzle assembly is configured to control the direction and/or characteristics of fluid flow exiting the supply conduit 229.

As shown in FIG. 2, the irrigation system 200 includes a control device 230 (e.g., control panel) that is in electronic communication with one or more components of the system 200. For example, the control device 230 may be in electronic communication with one or more tower boxes mounted at one or more tower structures 210, 212, and so forth. In an implementation, the control device 230 is mounted to the central pivot structure 202, a control cart, or a tower structure 210, 212. As shown, the control device 230 is mounted to the center pivot structure 202. The control device 230 is generally located on the structural element of the irrigation system 200 where the applicant/water is introduced into the irrigation system; however, other configurations known in the art are within the scope of the present disclosure.

The control device 230 is configured to monitor operating conditions and configured to control various functions of the irrigation system 200. In certain implementations, the control device 230 actively monitors the irrigation system's 200 function and performance including, but not limited to: a position of one or more conduit sections 220, 222 or tower structures 210, 212 (e.g., the position of the main section assembly 204), whether the irrigation system 200 is powered on or off, a voltage parameter associated with the irrigation system 200, a motor speed parameter associated with the irrigation system 200, an approximate ground speed parameter associated with the irrigation system 200, a direction parameter associated with the irrigation system 200, a diagnostic parameter associated with the irrigation system 200, whether the applicant is being supplied to the irrigation system 200 (e.g., whether the fluid displacement device is operational), whether the Stop in Slot (SIS) is powered on or off, an applicant pressure associated with the irrigation system 200, a time parameter, a date parameter, a field position parameter of the irrigation system components, end-gun status, and whether the programs (e.g., software programs, etc.) are running properly. The control device 230 also controls the irrigation system's 200 functions and settings including, but not limited to: start and stop, selectively powering the main fluid displacement device, an applicant application depth parameter, the direction of travel associated with the irrigation system 200, selectively powering the SIS, automatically reversing or stopping the irrigation system 200, automatically restarting the irrigation system 200, providing an operator auxiliary control to the system 200, writing and editing irrigation programs (e.g., irrigation software programs), and controlling sector and sequential programs (e.g., software programs). In another implementation, the control device 230 may cause an alert to be issued to the operator if there are any errors in the operation of the irrigation system 200 or if any of the functions or conditions monitored by the control device 230 have been compromised (e.g., ceased operation or are outside an acceptable range). Thus, the control device 230 may includes one or more processing units for executing software instructions, one or more memory units communicatively coupled to the processing units for storing the software instructions, and/or communication modules (e.g., receivers, transmitters, transceivers, etc.) for communicating with one or more components of the irrigation system 200

As described above, the variable nozzle assembly 100 may be coupled, as a detachable nozzle assembly or integral with the supply conduit 229, to the supply conduit 229. In one or more implementations, the irrigation system 200 may be configured to control the pump speed of a pump (e.g., fluid displacement device) 232 that is configured to control the pressure and the flow rate of an applicant dispersed from the supply conduit 229. For example, the irrigation system 200 may control the pump speed of a pump 232 through the control device 230 incorporated into the irrigation system 200. In an implementation, the control device 230 may include a pre-defined dispersal map based upon the characteristics of the land that the applicant is to be applied to. The pump 232 is configured to fluctuate the pressure and the flow rate of the applicant dispersed through the supply conduit 229 and, hence, the applicant dispersed through the nozzle 106 of the variable nozzle assembly 100. Therefore, the second position of the first plate portion 102 and the second position of the deflector 112 may vary as a function of the position of the irrigation system 200 as defined by the dispersal map. The changing of the opening characteristics (e.g., the area), through the translation of the first plate portion 102 with respect to the second plate portion 104, of the nozzle 106 varies the applicant stream dispersed from the nozzle 106 and may correlate to desired throw distances for the applicant stream. However, it is contemplated that the variable nozzle assembly 100 may be utilized with other water conduits (e.g., hoses, etc.) of the irrigation structure.

The variable nozzle assembly 100 may be fabricated from one or more suitable materials sufficient to be utilized in agricultural environments. For example, the variable valve assembly 100 may be comprised of a metal material, a plastic material, combinations thereof, and so forth. It is contemplated that the above materials are for example purposes only and not meant to be limiting. Thus, other materials may be utilized without departing from the scope of the present disclosure.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A variable nozzle assembly comprising:

A first plate portion, wherein the first plate portion is configured to extend over and partially cover a first portion of a water conduit, wherein the first plate portion comprises a front face which is configured to face away from the water conduit;

a second plate portion, wherein the second plate portion is configured to extend over and partially cover a second portion of the water conduit, wherein the second plate portion comprises a from face which is configured to face away from the water conduit; wherein the front face of the first plate portion is substantially parallel to the front face of the second plate portion;

a deflector assembly, wherein the deflector assembly comprises a deflector plate, a first deflector arm, a second deflector arm and a deflector support member; wherein the deflector plate is secured to the deflector support member; further wherein the deflector support member is secured between the first and second deflector arms; wherein the first deflector arm further comprises a first cam member and the second deflector arm further comprises a second cam member; and a first connecting member and a second connecting member; wherein the first deflector arm is rotatably secured to the first connecting member; further wherein the second deflector arm is rotatably secured to the second connecting member;

wherein the second plate portion is secured between the first connecting member and the second connecting member so that the deflector plate is position in front of the front face of the second plate portion; further wherein the deflector plate is angled away from the front face of the second plate portion at an angle of between 91 and 179 degrees;

wherein the first plate portion is slidably mounted between the first connecting member and the second connecting member so that the first plate portion may vertically slide between an up position and a down position; wherein the first plate portion is biased in the down position by a biasing mechanism; further wherein the first plate portion is functionally connected between the first cam member and the second cam member so that a force applied to the deflector plate will cause the first and second cam members to apply a force to the first plate portion so that the first plate portion is moved between the down position and the up position;

further wherein the front face of the first plate portion comprises a first notched portion having a first geometric shape;

further wherein the front face of the second plate portion comprises a second notched portion having a second geometric shape; wherein when the first plate portion is in the up position, the first geometric shape and the second geometric shape are positioned together to define a first water conduit opening having a third geometric shape;

further wherein when the first plate portion is in the down position, the first geometric shape and the second geometric shape are positioned together to define a second water conduit opening having a fourth geometric shape; wherein the area of the third geometric shape is greater than the fourth geometric shape.

\* \* \* \* \*